(12) United States Patent
Lee

(10) Patent No.: US 8,817,362 B2
(45) Date of Patent: Aug. 26, 2014

(54) MODULAR PATTERN ILLUMINATION AND LIGHT BEAM MULTIPLEXING FOR SELECTIVE EXCITATION OF MICROPARTICLES

(75) Inventor: Chun-Sheu Lee, Cupertino, CA (US)

(73) Assignee: Lightspeed Genomics, Inc., Santa Clara, CA (US)

( * ) Notice: Subject to any disclaimer, the term of this patent is extended or adjusted under 35 U.S.C. 154(b) by 7 days.

(21) Appl. No.: 13/458,928

(22) Filed: Apr. 27, 2012

(65) Prior Publication Data

US 2012/0275005 A1    Nov. 1, 2012

Related U.S. Application Data

(60) Provisional application No. 61/480,637, filed on Apr. 29, 2011.

(51) Int. Cl.
*G02F 1/29* (2006.01)
(52) U.S. Cl.
USPC .......................................................... 359/299
(58) Field of Classification Search
USPC ..................... 359/370, 577, 299; 356/4.09
See application file for complete search history.

(56) References Cited

U.S. PATENT DOCUMENTS

| | | | | |
|---|---|---|---|---|
| 6,115,126 A | * | 9/2000 | Chen et al. | 356/520 |
| 6,140,660 A | * | 10/2000 | Mermelstein | 250/550 |
| 7,907,646 B2 | | 3/2011 | Mizuuchi et al. | |
| 2005/0213071 A1 | | 9/2005 | Fukuda | |
| 2009/0061505 A1 | * | 3/2009 | Hong et al. | 435/287.2 |

FOREIGN PATENT DOCUMENTS

WO    WO 91/01517 A1    2/1991

OTHER PUBLICATIONS

PCT International Search Report and Written Opinion, PCT Application No. PCT/US12/35636, Aug. 17, 2012, 9 pages.

* cited by examiner

*Primary Examiner* — Joseph P Martinez
(74) *Attorney, Agent, or Firm* — Fenwick & West LLP

(57) ABSTRACT

A modular approach to a pattern illumination system for selective excitation of microparticles is used. A dual-channel pattern module having two single-channel pattern modules are oriented at a non-zero offset angle to each other. In this arrangement, a galvo-scanner based phase-shifting module is shared between the two channels. A set of tilt mirrors are used to direct the beams from the pattern modules onto the target plane. Additional layers of pattern modules can be added to accommodate any desirable number of additional channels. The additional layer(s) may be rotationally off-set from the other layer(s) by an angular amount to simplify the layout of optical components. A remote light source module may be connected to the pattern modules through optical fiber.

22 Claims, 5 Drawing Sheets

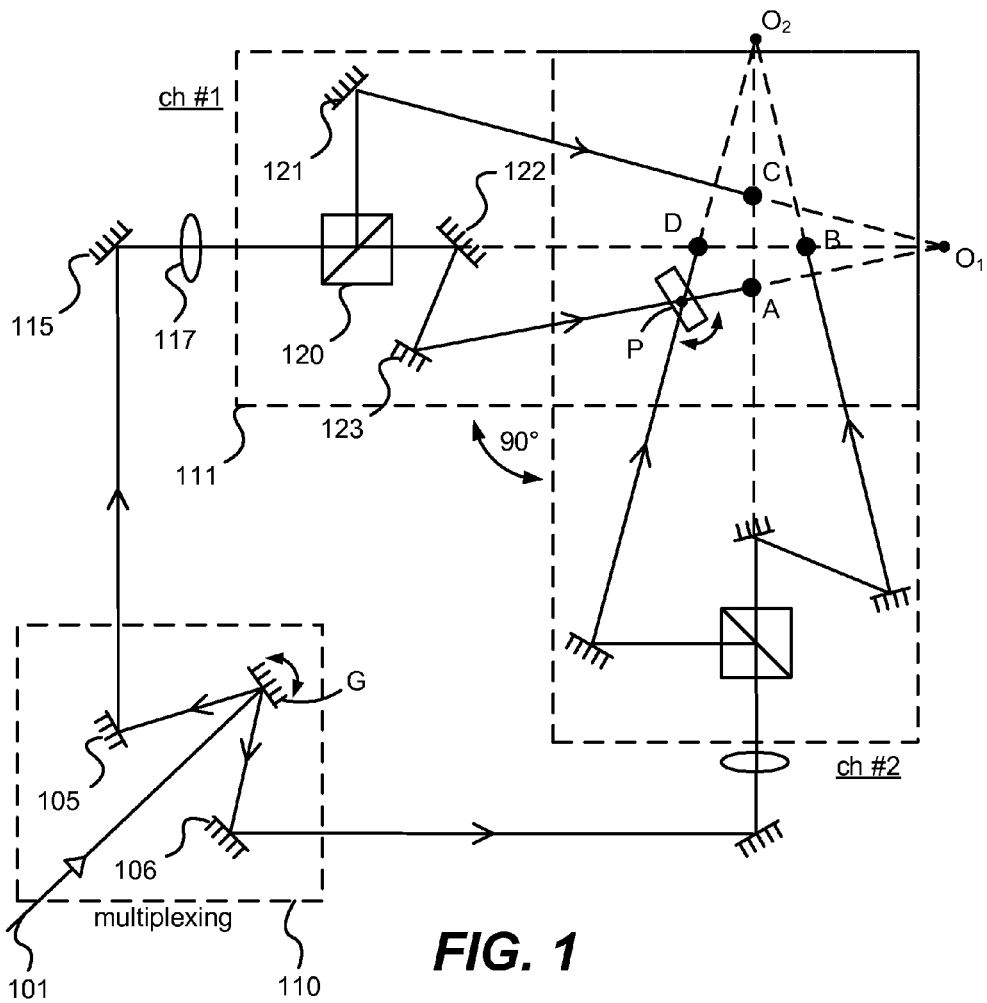
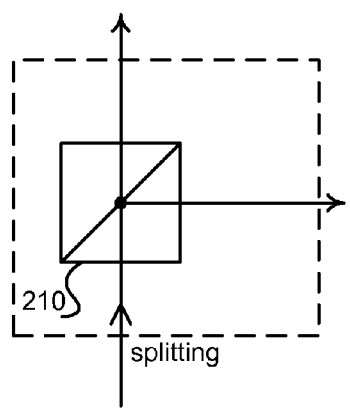
FIG. 1
FIG. 2

MODULAR PATTERN ILLUMINATION AND LIGHT BEAM MULTIPLEXING FOR SELECTIVE EXCITATION OF MICROPARTICLES

GOVERNMENT LICENSE RIGHTS

This invention was made with government support under grant number R44HG005127-02 (for "Deep-Submicron Optical Detection for High-Density High-Throughput DNA Sequencing") awarded by the National Institutes of Health. The government has certain rights in the invention.

CROSS-REFERENCE TO RELATED APPLICATION(S)

This application claims priority to U.S. Provisional Application No. 61/480,637, filed Apr. 29, 2011, titled "Modular Pattern Illumination and Light Beam Multiplexing for Selective Excitation of Microparticles," and this application is related to U.S. patent application Ser. No. 11,846,067, filed Aug. 28, 2007, titled "Apparatus for Selective Excitation of Microparticles," both of which are incorporated by reference in their entirety.

BACKGROUND

1. Field of the Invention

This invention generally relates to the field of optical microscopy imaging which uses selective illumination or excitation. More specifically, this invention relates to a method of using selective excitation patterns optimized for imaging of microparticles.

2. Description of the Related Art

A selective excitation scheme for microparticle imaging requires two laser beams to produce interference patterns (fringes) on the microparticle array plane in each pattern channel and at least two channels at different fringe orientations. In previous designs, fringe patterns at several different orientations on a target plane were implemented by constructing multiple pattern channels on the circumference of a semicircle or circle (an arrangement referred to as a "ring"). If the combination of the required fringe pitch and the number of channels goes beyond a certain limit, the beam paths between adjacent channels will cross each other. This circumstance of intercrossing beams complicates the system design and challenges the pattern channel alignment. An example of the arrangement of components that results in the intercrossing of beams is illustrated in FIG. 9, wherein the beam paths 901 for channel #1 and 902 for channel #2 cross each other.

To provide a light source to illuminate the pattern channels, conventionally a laser beam is split into several beams simultaneously using a diffractive grating or cascaded splitters and used to illuminate all of the pattern channels simultaneously. However, in real time operation of the apparatus, only one pattern channel is projected onto the microparticle array plane in the acquisition of the microparticle array image. The other pattern channels of the fringes are blocked. As a result, each pattern channel utilizes only a small fraction of the full laser power to illuminate the target samples and the illumination efficiency is significantly reduced.

SUMMARY

In various embodiments, the present invention provides a modular approach to a pattern illumination system for selective excitation of microparticles. A dual-channel pattern module having two single-channel pattern modules are oriented at a non-zero offset angle to each other. In this arrangement, a galvo-scanner based phase-shifting module is shared between the two channels. The phase-shifting module introduces a phase shift between the two beams corresponding to each channel. A set of tilt mirrors are used to direct the beams from the pattern modules onto the target plane.

In one implementation, additional layers of pattern modules can be added to accommodate any desirable number of additional channels. The additional layer(s) may be rotationally off-set from the other layer(s) by an angular amount (for example 45 degrees) to simplify the layout of optical components while avoiding beams being blocked by components of another layer. Additionally, the folding points at which beams are reflected from tilt mirrors to be re-directed onto the target plane are more widely spaced for levels further from the target plane, so that the relative angle between the pair of interfering beams corresponding to each channel is the same for all channels.

In one implementation, a remote light source module may be connected to the pattern modules through optical fiber. In this arrangement, fiber couplers route light through optical fibers and fiber collimators into respective pattern modules.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 1 is an illustration of a beam multiplexing module and two pattern generation modules that are oriented at 90 degrees to each other in the same plane in accordance with an embodiment of the invention.

FIG. 2 illustrates a static beam splitting module in accordance with an embodiment as an alternative to the beam multiplexing module illustrated in FIG. 1.

Figure 3:
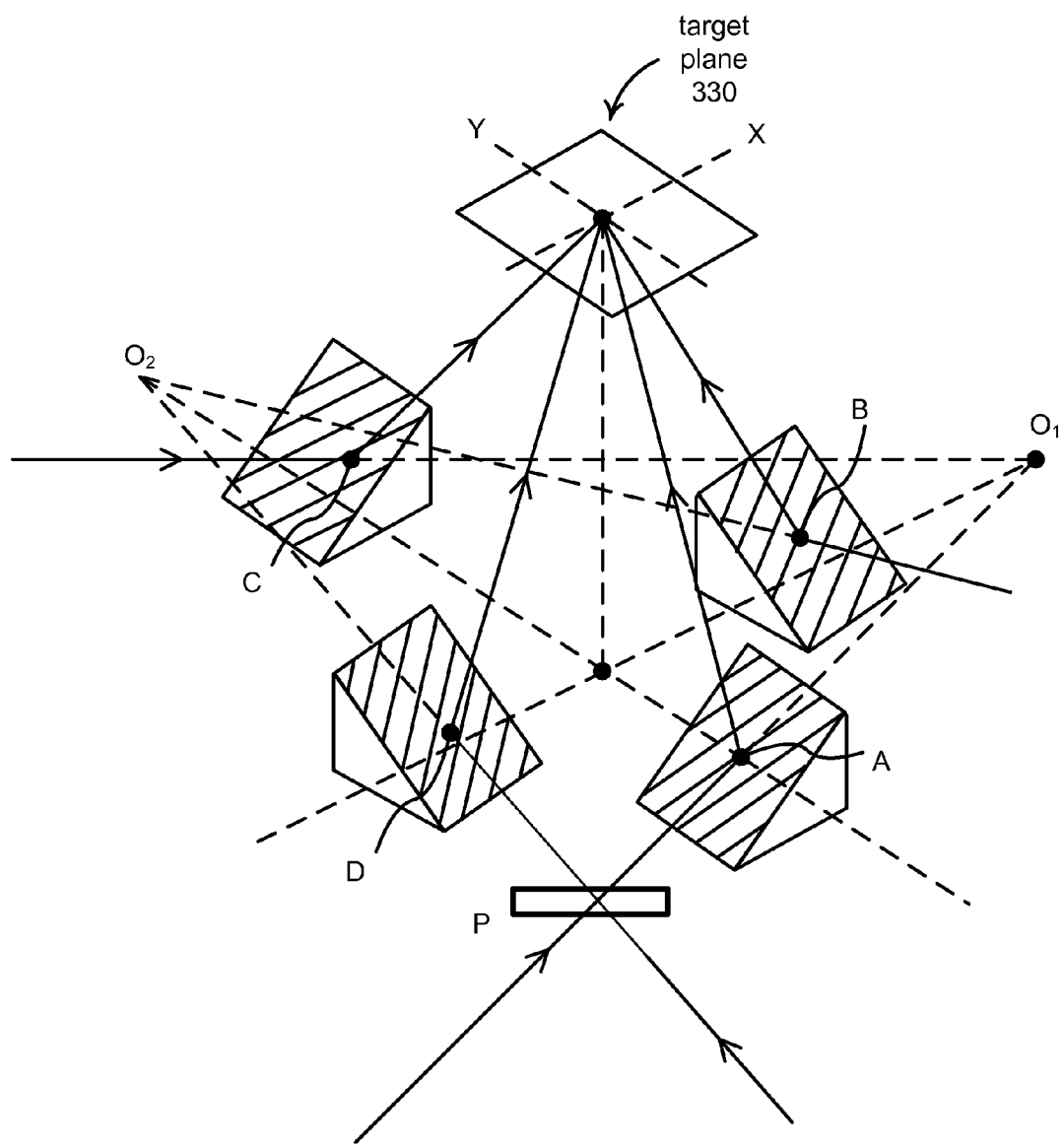
FIG. 3 is a perspective view of four tilt mirrors that reflect beams from the pattern generation modules illustrated in FIG. 1 to overlap at a target plane, in accordance with an embodiment.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The present invention makes use of a modular configuration to implement a pattern illumination system of any desirable number of channels. FIG. 1 illustrates the configuration of the basic dual-channel pattern module in which two single-channel pattern modules within a common plane are oriented, for example, at 90 degrees from each other, but other non-zero offset angles between the pattern modules can be used in other examples. Similarly, in other examples, the pattern modules may not be in a common plane. In the example shown in FIG. 1, a galvo-scanner-based phase-shifting module P is shared between these two channels. By eliminating the need for a phase-shifting module for each channel separately, fewer optical components are used, resulting in a manufacturing cost savings. Also, in one implementation of the invention, no anamorphic beam expander is used, in contrast to implementations used before this invention.

As illustrated in FIG. 1, an optical beam 101 enters the beam multiplexing module 110 and reflects from a scanning mirror G which switches the incident beam 101 between channel #1 and channel #2. As illustrated in FIG. 1, when scanning mirror G is positioned to reflect light to channel 1, the reflected light from scanning mirror G reflects from mirror 105 and mirror 115 before passing through a lens 117. Lens 117 may perform beam shaping, focusing, and/or conditioning for light that enters into channel #1. The components encompassed by dotted rectangle 111 represent the components of a single channel pattern module of the two single-channel pattern modules illustrated in FIG. 1. The components of the single channel pattern module include beam splitter 120, mirror 121, mirror 122, mirror 123, and galvo-scanner based phase-shifting module, which in this example comprises a rotatable window plate P. The beam splitter 120 splits the input beam into two beams. A first beam of the two beams reflects from mirror 121, which aims the beam at object point $O_1$. The second beam of the two beam reflects from mirror 122 and mirror 123 which also aims the beam at object point $O_1$ after passing through the galvo-scanner based phase shifting module comprising a rotatable window plate P that provides a fringe shift when interfered with the first beam. The rotatable window plate P can be rotated, for example using a galvanometer so that the second beam passing through the window plate encounters different thicknesses of the window plate at different positions in the rotation of window plate P. Thus, the window plate P varies the optical path length of the second beam based on the thickness of the window, and provides a fringe shift when the second beam is interfered with the first beam.

When scanning mirror G is positioned to reflect light to channel #2, the reflected light from scanning mirror G reflects from mirror 106, and after exiting the multiplexing module 110, the beam encounters similar lens, beamsplitter, and mirror components in channel #2 as described above with respect to channel #1. These components split the light entering channel #2 and aim the two beams at object point $O_2$. As described above, the rotatable window plate P provides a fringe shift when the first beam of channel #2 is interfered with the second beam of channel #2. Note that in the arrangement of components shown in FIG. 1, both channels #1 and #2 share the rotatable window plate P, thus providing a reduced number of components and providing manufacturing cost savings.

In previously used designs, the pattern beams illuminate the target surface at an incident angle of 68 degrees to the normal. Due to the off-axis illumination, the illuminating beam spots on the target plane are elliptical. Therefore, an anamorphic beam expander was used in the beam pattern module to compensate for the beam ellipticity and restore a substantially circular beam spot on the target plane. In contrast, the present invention illuminates the target surface at a near normal incidence angle. Therefore, the need for an anamorphic beam expander is eliminated, which results in a manufacturing cost savings. Also, the reflection loss on the surface of the target, such as a flow cell for example, is greatly reduced at the normal angle of incidence and less sensitive to variation of the beam polarization. As a result, lasers with a lower power level can be used and the cost of lasers can be reduced.

FIG. 2 illustrates a static beam splitting module 210 in accordance with an embodiment as an alternative to the beam multiplexing module 110 illustrated in FIG. 1. The beam multiplexing module 110 is preferred for implementations where it is desirable to provide the full laser power to illuminate the target samples, because the full power of a laser beam is used to illuminate each individual pattern channel. Thus, the required laser power level is greatly reduced as compared to the conventional static beam splitting scheme. Accordingly, the cost of light sources is reduced when using the beam multiplexing module 110. The static beam splitting scheme can eliminate the cost of a scanner-mirror G and the driving electronics. This scheme is suitable for a two-channel system, in which half of the laser power is utilized.

FIG. 3 is a perspective view of four tilt mirrors that reflect beams from the pattern generation modules illustrated in FIG. 1 to overlap at a target plane, in accordance with an embodiment. Each single channel pattern module includes two tilt mirrors, each tilt mirror respectively folds the optical path of one of the two beams of the pattern module from being directed to a point in the same plane as the pattern modules to being directed to the target plane 330, which lies outside the plane of the pattern module. In the example illustrated in FIGS. 1 and 3, a tilt mirror placed at folding point A and a tilt mirror placed at folding point C direct beams that would have intersected at point $O_1$, to intersect at the target plane 330 above the plane in which the pattern module resides. Similarly for channel #2, a tilt mirror placed at folding point B and a tilt mirror placed at folding point D direct beams that would have intersecting at point $O_2$, to intersect at the target plane 330 above the plane in which the pattern module resides. For example a set of 45 degree tilt mirrors can be used to illuminate a common location in the target plane 330. In other arrangements, tilt mirrors of other degrees can be used to illuminate a common location in the target plane 330.

It is noted that in various embodiments, the pattern generation modules described herein are suitable for use in both front and back illumination microscopes. In a front illumination case, the objective lens (not shown in FIG. 3) of the microscope is located on the same side of the target plane as the beams from the pattern modules shown in FIG. 3. In the back illumination case, the objective lens of the microscope is located on the opposite side of the target plane as the beams from the pattern modules shown in FIG. 3.

Figure 4:
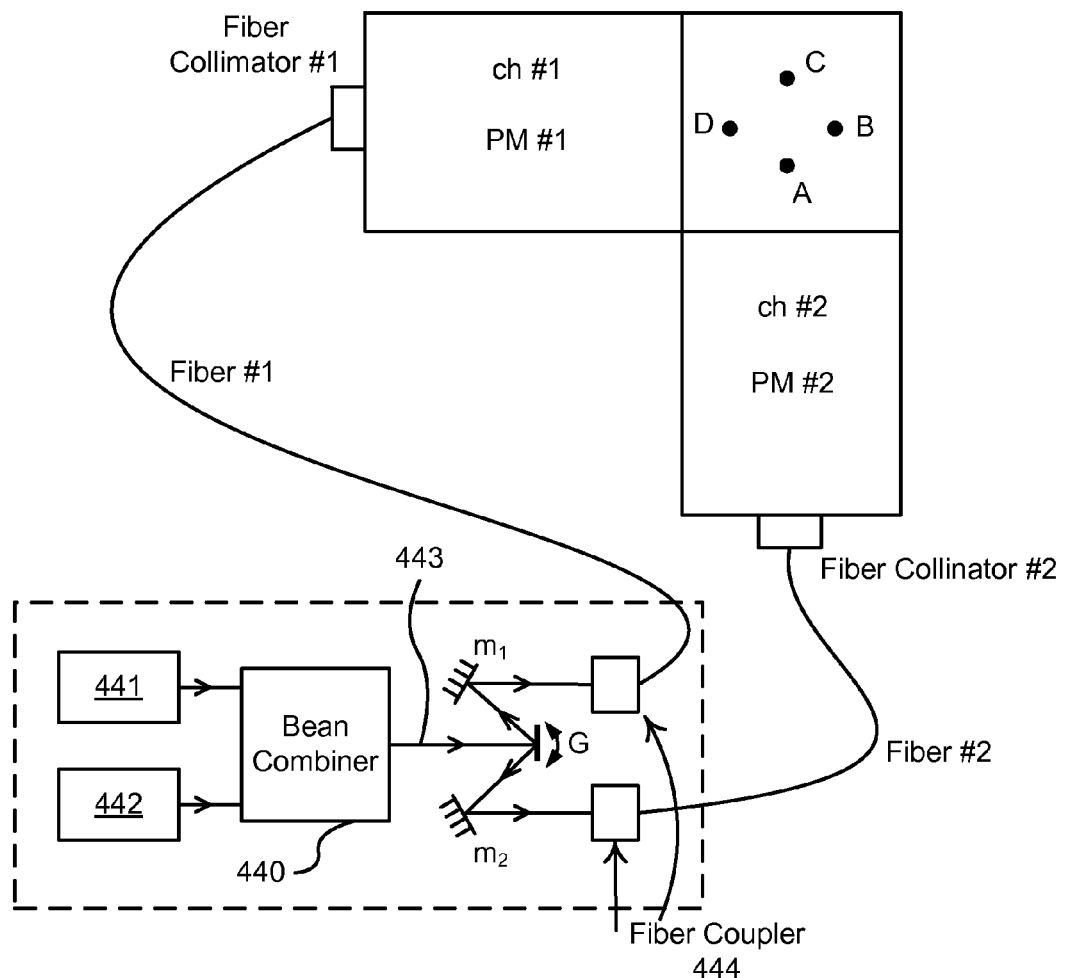
FIG. 4 illustrates a remote light source module that can be used in conjunction with the dual channel pattern generation modules illustrated in FIG. 1, in accordance with an embodiment.

FIG. 4 illustrates a remote light source module that can optionally be used in conjunction with the dual channel pattern generation modules illustrated in FIG. 1, in accordance with an embodiment. The use of a remote light source may be beneficial to make the system for selective excitation of microparticles more compact and impose fewer constraints on the layout of the modules. Additionally, the ability to generate light at a remote source may be beneficial in isolating the pattern modules from environmental influences that arise in the vicinity of the light source (such as heat, vibration, and the like). As shown, two or more lasers 441, 442 can be combined by a beam combiner 440 so that the beams exit the beam combiner 440 along a common path 443. For example, multiple laser systems 441, 442 at different wavelengths can be combined into one common beam path 443. The combined beam encounters scanning mirror G that can direct the combined beam to a fiber coupler 444 for fiber #1 via mirror $m_1$ or direct the combined beam to a fiber coupler 444 for fiber #2 via mirror $m_2$. The combined beam passes through fiber #1 and fiber collimator #1 on the way into the pattern module PM #1 for channel #1, or the combined beam passes through fiber #2 and fiber collimator #2 on the way into the pattern module PM #2 for channel #2.

Figure 5:
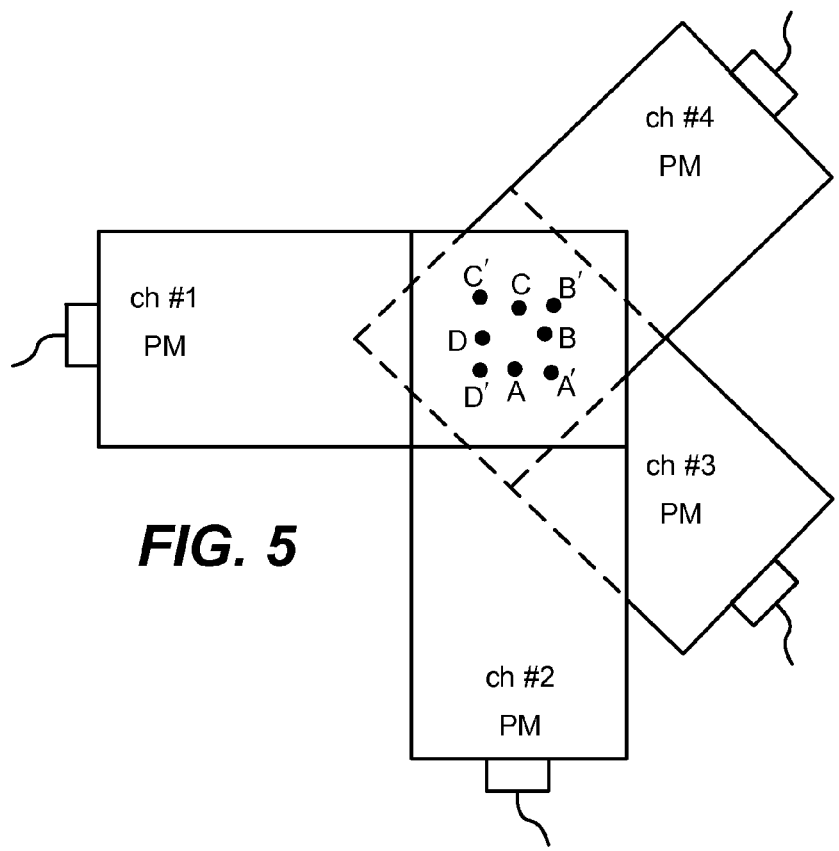
FIG. 5 illustrates two layers of the two pattern generation modules illustrated in FIG. 1, wherein the two layers are offset by 45 degrees relative to each other, in accordance with an embodiment.
Figure 6:
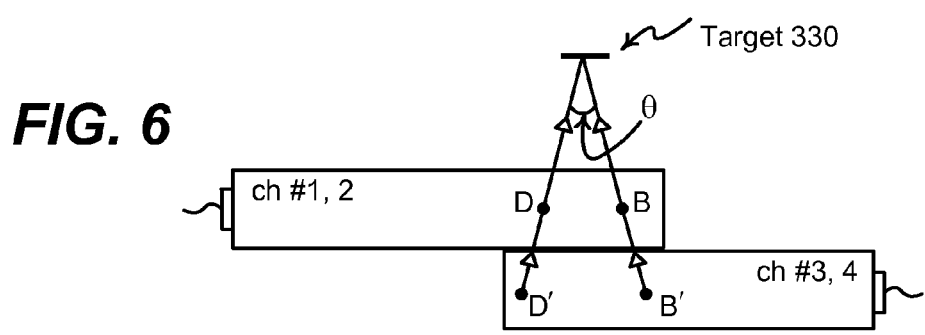
FIG. 6 illustrates a side view of the two layers of pattern generation modules illustrated in FIG. 5, in accordance with an embodiment.

FIG. 5 illustrates two layers of the two pattern generation modules illustrated in FIG. 1, wherein the two layers are offset by 45 degrees relative to each other, in accordance with an embodiment. The configuration of FIG. 5 illustrates a four-channel pattern illumination system, wherein two sets of the two single-channel pattern modules shown in FIG. 1 are stacked into vertical layers. The folding points for channel #3 and channel #4 are shown collectively as A', B', C' and D'. FIG. 6 illustrates a side view of the two layers of pattern generation modules illustrated in FIG. 5, in accordance with an embodiment. As illustrated in FIG. 6, the folding points A', B', C' and D' are separately more widely for the lower layer so that the pattern angle θ is the same for all channels. The pattern angles of different extents may be mixed among channels depending on performance requirements of the system. In addition, in other arrangements, the two layers may be offset by larger or smaller angles than 45 degrees, and, as discussed above, pattern modules within one layer may be oriented at larger or smaller offset angles from one another than the 90 degrees illustrated in FIG. 5.

Figure 7:
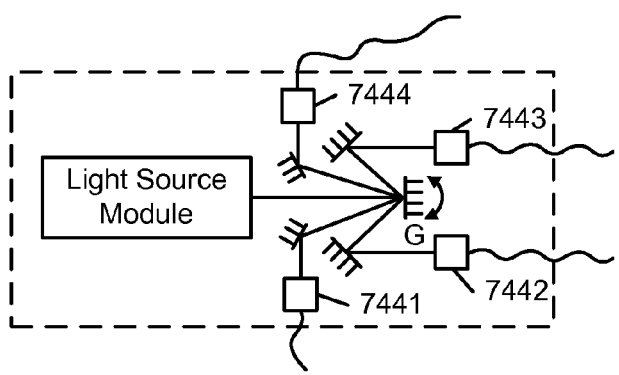
FIG. 7 illustrates a four-channel light source and multiplexing module that can be used to provide fiber coupling to the multiple-layer, multiple-channel pattern generation module illustrated in FIGS. 5-6.

FIG. 7 illustrates a four-channel light source and multiplexing module that can optionally be used to provide fiber coupling to the multiple-layer, multiple-channel pattern generation module illustrated in FIGS. 5-6. In this example, a light source module directs a beam to scanning mirror G. Scanning mirror G can be positioned to direct light to a fiber coupler 7441 for channel #1, a fiber coupler 7442 for channel #2, a fiber coupler 7443 for channel #3, or a fiber coupler 7444 for channel #4, each via a respective mirror.

Figure 8:
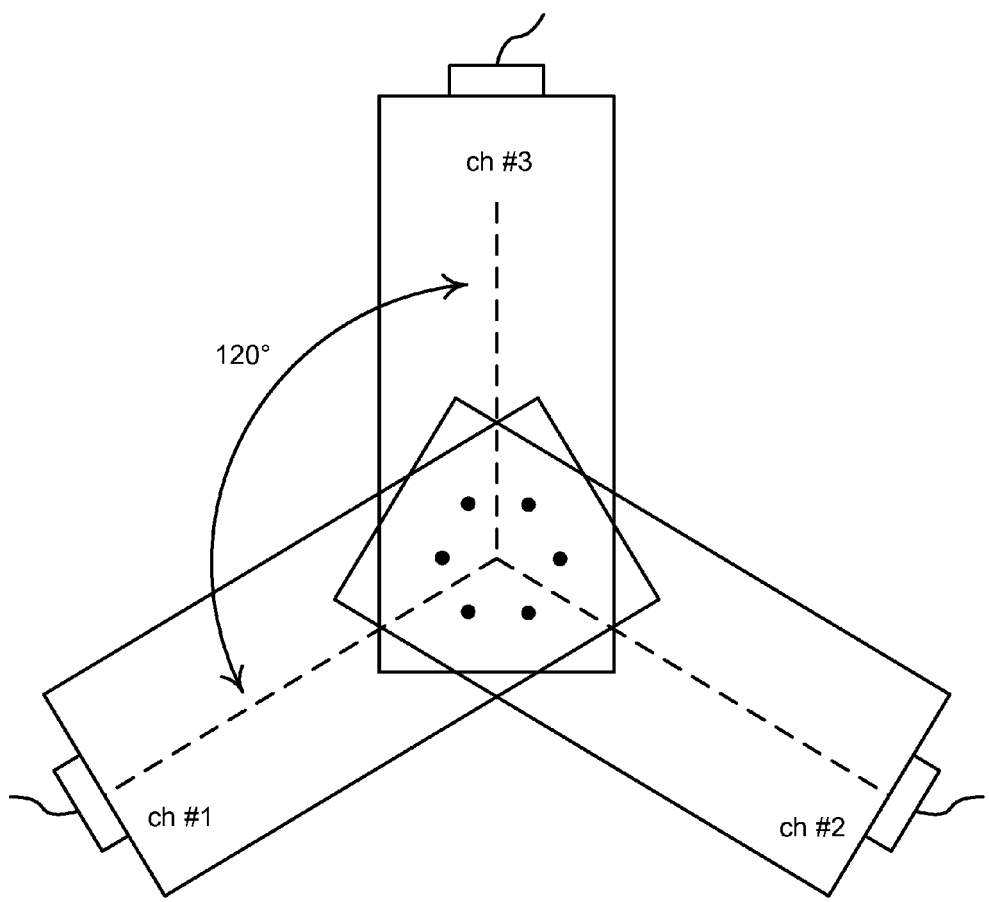
FIG. 8 illustrates a three-channel pattern module, in accordance with an embodiment of the invention.
Figure 9:
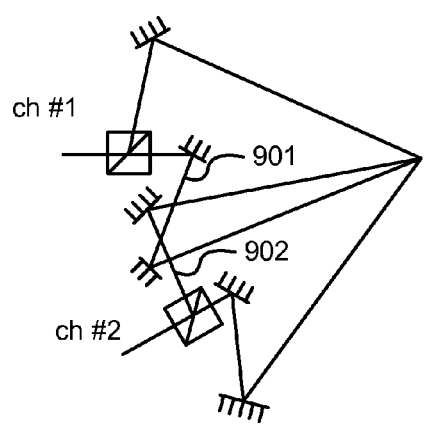
FIG. 9 illustrates the overlap of beam paths that occurs between adjacent pattern modules in configurations of multiple channel systems with large pattern angles that are in the same plane.

FIG. 8 illustrates a three-channel pattern module, in accordance with an embodiment of the invention. In one implementation, three single-channel modules are oriented at 120 degrees to each other, but other non-zero offset angles can also be used, and in various embodiments using the techniques described herein the single-channel modules need not be all in the same layer. Optionally, as with two single-channel modules, a remote light source and beam switching module, as well as a fiber beam delivery scheme can be used with a three-channel pattern module. For example, the remote light source and beam switching module illustrated in FIG. 7 can be modified so that scanning mirror G can be positioned to direct light to any one of three fiber couplers for the three channels, each via a respective mirror.

Upon reading this disclosure, those of skill in the art will appreciate still additional alternative structural and functional designs for a method and system for modular pattern illumination and light beam multiplexing for selective excitation of microparticles. For example, this invention is flexible in response to the desirable number of pattern channels. If the desired number of pattern channels is changed, the basic building blocks of the pattern modules described herein can be used to construct multiple layers for more channels. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A pattern illumination system, the system comprising:
 a first single-channel pattern module; and
 a second single-channel pattern module, oriented at a non-zero offset angle from the first pattern module, wherein the first and second pattern modules share a phase shifting module, wherein the shared phase shifting module acts on a single distinct beam from each respective pattern module.

2. The pattern illumination system of claim 1, wherein the first and second pattern modules are in a common plane.

3. The pattern illumination system of claim 1, wherein the phase shifting module comprises a rotatable window plate through which one beam passes from each of the first and second pattern modules.

4. The pattern illumination system of claim 3, wherein the rotatable window plate varies the optical path length of a second beam of the first pattern module passing through the rotatable window plate to provide a fringe shift when the second beam of the first pattern module is interfered with a first beam of the first pattern module, and wherein the rotatable window plate varies the optical path length of a second beam of the second pattern module passing through the rotatable window plate to provide a fringe shift when the second beam of the second pattern module is interfered with a first beam of the second pattern module.

5. The pattern illumination system of claim 1, further comprising a beam multiplexing module that directs a beam alternately between the first pattern module and the second pattern module.

6. The pattern illumination system of claim 5, wherein the beam multiplexing module comprises a scanning mirror to direct the beam alternately between the first pattern module and the second pattern module.

7. The pattern illumination system of claim 1, further comprising a remote light source coupled to the first and second pattern modules with optical fiber.

8. The pattern illumination system of claim 7, wherein the remote light source comprises at least two lasers at different wavelengths combined into a common beam path.

9. The pattern illumination system of claim 1, further comprising a set of tilt mirrors to direct beams from the first and second pattern modules to a target plane.

10. The pattern illumination system of claim 9, wherein beams from the first and second pattern modules intersect the target plane at nearly normal to the target plane.

11. The pattern illumination system of claim 10, wherein the beams from the first and second pattern modules intersect the target plane at a substantially circular beam spot on the target plane.

12. The pattern illumination system of claim 1, further comprising:
 a third single-channel pattern module;
 a fourth single-channel pattern module, oriented at a non-zero offset angle from the third pattern module, wherein the third and fourth pattern modules share a second phase shifting module, and the third and fourth pattern modules are in a layer below the first and second pattern modules, and the third and fourth pattern modules are rotationally offset from the first and second pattern modules.

13. The pattern illumination system of claim 12, wherein the second phase shifting module comprises a rotatable window plate through which one beam passes from each of the third and fourth pattern modules.

14. The pattern illumination system of claim 13, wherein the rotatable window plate varies the optical path length of a second beam of the third pattern module passing through the rotatable window plate to provide a fringe shift when the second beam of the third pattern module is interfered with a first beam of the third pattern module, and wherein the rotatable window plate varies the optical path length of a second beam of the fourth pattern module passing through the rotatable window plate to provide a fringe shift when the second beam of the fourth pattern module is interfered with a first beam of the fourth pattern module.

15. The pattern illumination system of claim 12, further comprising a beam multiplexing module that directs a beam alternately between the first, second, third, and fourth pattern modules.

16. The pattern illumination system of claim 15, wherein the beam multiplexing module comprises a scanning mirror to direct the beam alternately between the first, second, third, and fourth pattern modules.

17. The pattern illumination system of claim 12, further comprising a remote light source coupled to the first, second, third, and fourth pattern modules with optical fiber.

18. The pattern illumination system of claim 12, further comprising a set of tilt mirrors to direct beams from the first, second, third, and fourth pattern modules to a target plane.

19. The pattern illumination system of claim 18, wherein beams from the first, second, third, and fourth pattern modules intersect the target plane at nearly normal to the target plane.

20. The pattern illumination system of claim 19, wherein the beams from the first, second, third, and fourth pattern modules intersect the target plane at a substantially circular beam spot on the target plane.

21. A pattern illumination system, the system comprising:
a first single-channel pattern module in a first plane; and
a second single-channel pattern module in a second plane, the second plane distinct from the first plane, wherein beams from the first and second pattern modules intersect a target plane, the target plane distinct from the first and second planes, and the first and second planes oriented as stacked layers.

22. The system of claim 21, wherein the first and second planes are parallel planes.

* * * * *